(12) United States Patent
Schmit

(10) Patent No.: US 9,804,833 B2
(45) Date of Patent: *Oct. 31, 2017

(54) SMALL/MEDIUM BUSINESS APPLICATION DELIVERY PLATFORM

(71) Applicant: AT&T Mobility II LLC, Atlanta, GA (US)

(72) Inventor: Edward Schmit, Seattle, WA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/482,976

(22) Filed: Apr. 10, 2017

(65) Prior Publication Data

US 2017/0212749 A1 Jul. 27, 2017

Related U.S. Application Data

(63) Continuation of application No. 15/267,850, filed on Sep. 16, 2016, now Pat. No. 9,652,219, which is a continuation of application No. 12/362,104, filed on Jan. 29, 2009, now Pat. No. 9,489,185.

(51) Int. Cl.
*G06F 9/445* (2006.01)
*G06Q 40/00* (2012.01)
*G06Q 30/06* (2012.01)

(52) U.S. Cl.
CPC ............... *G06F 8/65* (2013.01); *G06F 8/61* (2013.01); *G06Q 30/06* (2013.01); *G06Q 30/0601* (2013.01); *G06Q 40/12* (2013.12); *G06F 9/44505* (2013.01)

(58) Field of Classification Search
CPC ......... G06F 8/61; G06F 8/65; G06F 9/44505; G06Q 30/06; G06Q 30/0601; G06Q 40/12
USPC .................................................. 717/173, 177
See application file for complete search history.

(56) References Cited

U.S. PATENT DOCUMENTS

| | | | |
|---|---|---|---|
| 7,334,226 B2 * | 2/2008 | Ramachandran ......... | G06F 8/61 709/220 |
| 2004/0083474 A1 * | 4/2004 | McKinlay ................. | G06F 8/61 717/176 |
| 2004/0224674 A1 * | 11/2004 | O'Farrell .......... | G06F 17/30575 455/418 |
| 2005/0091269 A1 * | 4/2005 | Gerber ................ | G06F 9/44505 |
| 2005/0132348 A1 * | 6/2005 | Meulemans .............. | G06F 8/65 717/168 |

(Continued)

OTHER PUBLICATIONS

Office Action dated Jan. 3, 2012 for U.S. Appl. No. 12/362,104, 23 pages.

(Continued)

*Primary Examiner* — Wei Zhen
*Assistant Examiner* — Mohammed Huda
(74) *Attorney, Agent, or Firm* — Amin, Turocy & Watson, LLP

(57) ABSTRACT

Purchase, dissemination, configuration, or provisioning of applications to a mobile device is enabled. The systems can comprise devices that receive indications from a small to medium sized businesses of a need for an application, obtain the application from an independent software vendor, configure the application for utilization on the mobile device, and thereafter dispatches the application to the mobile device.

20 Claims, 10 Drawing Sheets

(56) References Cited

U.S. PATENT DOCUMENTS

| | | | | |
|---|---|---|---|---|
| 2005/0172281 A1* | 8/2005 | Goring | ............... | G06F 8/20 717/174 |
| 2010/0142421 A1* | 6/2010 | Schlicht | ............ | H04W 4/20 370/310 |

OTHER PUBLICATIONS

Office Action dated Jul. 30, 2013 for U.S. Appl. No. 12/362,104, 29 pages.

Office Action dated Jul. 15, 2014 for U.S. Appl. No. 12/362,104, 36 pages.

Office Action dated Jan. 27, 2015 for U.S. Appl. No. 12/362,104, 45 pages.

Office Action dated Dec. 16, 2015 for U.S. Appl. No. 12/362,104, 56 pages.

\* cited by examiner

SMALL/MEDIUM BUSINESS APPLICATION DELIVERY PLATFORM

RELATED APPLICATION

The present application is a continuation of, and claims priority to each of, U.S. patent application Ser. No. 15/267,850, filed Sep. 16, 2016, and entitled "SMALL/MEDIUM BUSINESS APPLICATION DELIVERY PLATFORM," which is a continuation of U.S. patent application Ser. No. 12/362,104 (now U.S. Pat. No. 9,489,185), filed Jan. 29, 2009, and entitled "SMALL/MEDIUM BUSINESS APPLICATION DELIVERY PLATFORM," the entire contents of which applications are hereby incorporated by reference herein.

BACKGROUND

Mobile devices and networking technologies have transformed many important aspects of everyday life. Mobile devices, such as smart phones, cell phones, and the like, have become a daily necessity rather than a luxury, communication tool, and/or entertainment center, and can now provide individuals with tools to manage and perform work functions such as reading and/or writing emails, setting up calendaring events such as meetings, providing games and entertainment aspects, and/or store records and images in a permanent and reliable medium. Networking technologies, like the Internet, have provided users with virtually unlimited access to remote systems, information and associated applications.

As mobile devices and networking technologies become robust, secure and reliable, ever more consumers, wholesalers, retailers, entrepreneurs, educational institutions, advocacy groups and the like are shifting paradigms and employing the Internet and similar technologies to undertake business rather than traditional "brick and mortar" means of doing business. For example, many businesses and consumers are providing web sites and/or on-line services (e.g., for purchasing food and clothing, searching for information, sending email and playing interactive games).

Nevertheless, despite such advances in both mobile device technologies and ancillary network capabilities, the current problem facing small to medium business entities and/or individuals, is the inability to identify, purchase, provision, and/or manage hosted applications on multiple disparate mobile devices from a single administrative source, and further, once such applications have been disseminated to a plurality of mobile devices, adding, modifying, and managing additional users and/or the distribution of further applications and/or updates for previously deployed applications situated on the various mobile devices from such an administrative source. Accordingly, the subject matter as claimed is directed toward resolving or at the very least mitigating, one or all of the foregoing problems.

DETAILED DESCRIPTION

Figure 1:
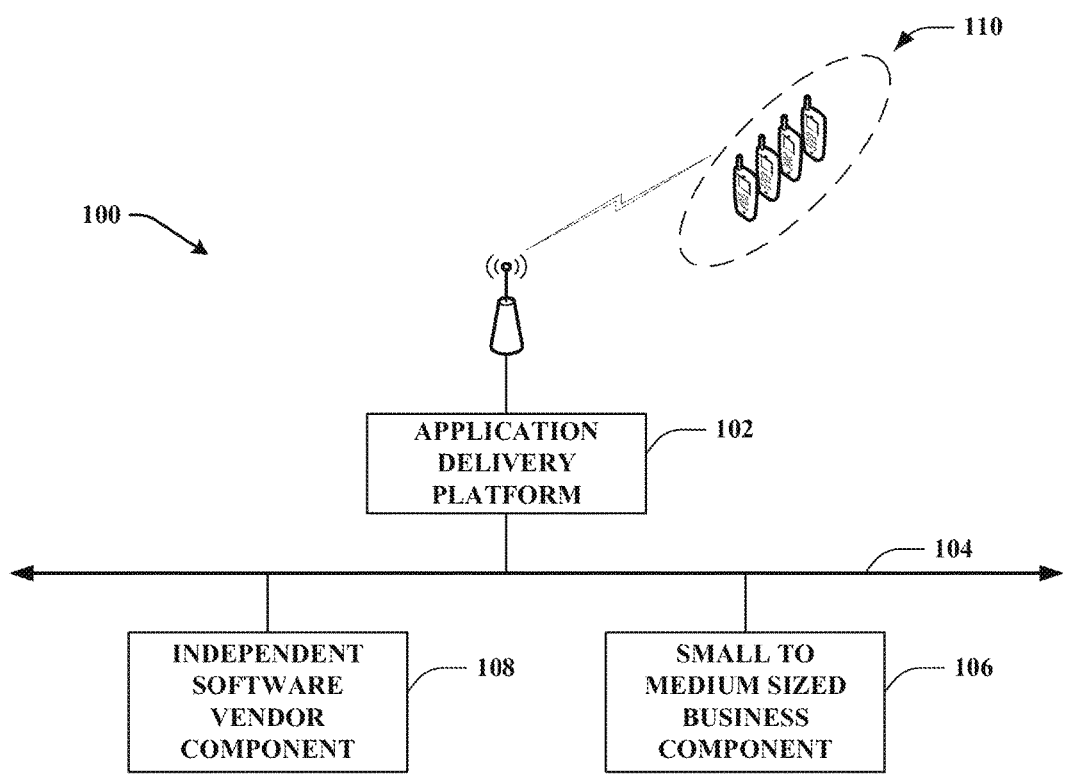
FIG. 1 illustrates a machine-implemented system that facilitates and/or effectuates purchase, configuration, dissemination, or provisioning of applications to mobile devices in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The subject application in accordance with various aspects is directed towards providing small to medium sized business entities and/or individual users the capability to find, buy, provision, and/or manage hosted applications. Further, the claimed matter is also directed towards enabling small to medium sized business entities and/or individuals the ability, once hosted applications have been deployed, to undertake routine maintenance tasks to add/manage additional users and/or applications from a single administrative facility.

FIG. 1 illustrates a system 100 that effectuates and/or facilitates mobile application delivery to a plethora of disparate mobile devices. As illustrated system 100 can include application delivery platform 102 that can provide network and/or system administrators employed by small to medium sized business entities and/or organizations, as well as individuals of their own volition, the ability to identify, purchase, provision, and/or manage hosted applications from a single source (e.g., application delivery platform 102). Moreover, application delivery platform 102 can make available facilities and/or functionalities that allow network and/or system administrators associated with such small to medium sized business entities and/or organizations, as well as individual users, as circumstances dictate, to add additional users and/or applications to a multitude of disparately configured mobile devices upon which the hosted applications or solutions have been deployed. Furthermore, application delivery platform 102 can provide tools that can be utilized by cellular telecommunications provider sales and/or marketing personnel to sell and/or provision applications to the various and/or disparate mobile devices associated and/or utilized by small to medium sized business organizations and/or entities and individual users. In this manner, application delivery platform 102 can provide opportunity for network and/or system administrators associated with small to medium sized business entities and/or organizations, as well as individual users to find suitable solutions or applications that satisfy their business or personal needs and to thereafter purchase, deploy, and/or manage these distributed solutions from a single point of presence.

Application delivery platform 102, as illustrated, via network topology and/or cloud 104, can be in continuous and/or operative or sporadic and/or intermittent communication with small to medium sized business component 106 and independent software vendor component 108. Additionally, application delivery platform 102 can also be in continuous and/or operative or sporadic and/or intermittent communication with a plurality of mobile devices 110 utilizing over the air (OTA) data interchange technologies and/or mechanisms. As will be appreciated by those of reasonable skill in the art, mobile devices 110 can include a disparity of different, diverse and/or disparate portable devices including Tablet PC's, server class portable computing machines and/or databases, laptop computers, notebook computers, cell phones, smart phones, transportable handheld consumer appliances and/or instrumentation, portable industrial devices and/or components, personal digital assistants, multimedia Internet enabled phones, multimedia players, and the like. Moreover, as will be further appreciated by those of ordinary skill in the art mobile devices 110 can be assigned or allocated to individual users within a particular business organization based at least in part on job function. For instance, the chief technology officer (CTO) of a small company can be assigned or allocated a mobile device that is commensurate with his/her job functions. Similarly, marketing personnel of the same small company can be assigned or allocated mobile devices more suited to their particular job functionalities. Additionally, in regard to mobile devices 110, even where similar (or a homogeneity of) mobile devices are provided to all employees in the organization the applications deployed on such devices can be diverse and based for, the most part, on the users' job functionality within the organization.

Application delivery platform 102 can be implemented entirely in hardware and/or a combination of hardware and/or software in execution. Further, application delivery platform 102 can be incorporated within and/or associated with other compatible components. Additionally, application delivery platform 102 can be, but is not limited to, any type of machine that includes a processor and/or is capable of effective communication with network topology and/or cloud 104. Illustrative machines that can comprise application delivery platform 102 can include desktop computers, server class computing devices, laptop computers, notebook computers, Tablet PCs, consumer and/or industrial devices and/or appliances, hand-held devices, and the like.

Network topology and/or cloud 104 can include any viable communication and/or broadcast technology, for example, wired and/or wireless modalities and/or technologies can be utilized to effectuate the claimed subject matter. Moreover, network topology and/or cloud 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. Furthermore, as those skilled in the art will appreciate and understand various data communications protocols (e.g., TCP/IP, Ethernet, Asynchronous Transfer Mode (ATM), Fiber Distributed Data Interface (FDDI), Fibre Channel, Fast Ethernet, Gigabit Ethernet, Wi-Fi, Token Ring, Frame Relay, etc.) can be utilized to implement suitable data communications.

Small to medium sized business component 106 can include and encompass utilization of a myriad of diverse devices and/or components that typically can be employed by and within small to medium sized business organizations and or by individuals. As those moderately conversant in this field of endeavor will appreciate small to medium sized business organizations as referred to herein can include sole proprietorships, partnerships, limited liability corporations, or small to medium sized corporate entities. For example, a small to medium sized business organization can be a medical practice, shopping establishment, management consulting partnership, architecture firm, manufacturing foundry, marketing management consultancy, and the like. Moreover, as will also be appreciated, such small to medium sized organizations can make use of a wide variety of components such as those implemented entirely in hardware and/or as a combination of hardware and/or software in execution. Thus, small to medium sized business component 106 can be, but is not limited to, any type of mechanism, machine, device, facility, and/or instrument that includes a processor and/or is capable of effective and/or operative communications with network topology and/or cloud 104. Mechanisms, machines, devices, facilities, and/or instruments that can comprise small to medium sized business component 106 can include one or more of Tablet PC's, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like. Additionally, it should also be noted, without loss of generality, that while small to medium sized business component 106 is depicted for the sake of simplicity of explanation as being a single monolithic corpus, small to medium sized business component 106 can be an aggregation of a multiplicity of independently operating small to medium sized commercial ventures, individuals, single business entities operating for their own independent benefit, or an agglomeration of the foregoing that have temporarily united to achieve economies of scale.

Independent software vendor component 108, like small to medium sized business component 106, can encompass and include utilization of numerous disparate devices and/or components that can generally be employed by software vendors and/or application developers in the creation, development, and/or maintenance of applications that can ultimately be deployed on various processing platforms, such as mobile devices (e.g., mobile devices 110), industrial and consumer appliances, computing platforms, and the like. Once again as will be appreciated by those conversant in this field of endeavor, independent software vendor component 108 can be implemented entirely in hardware and/or as a combination of hardware and/or software in execution. Further, independent software vendor component 108 can be, but is not limited to, any type of engine, machine, instrument of conversion, or mode of production that includes a processor and/or is capable of effective and/or operative communications with network topology and/or cloud 104. Illustrative instruments of conversion, modes of production, engines, mechanisms, devices, and/or machinery that can comprise and/or embody independent software vendor component 108 can include desktop computers, server class computing devices and/or databases, cell phones, smart phones, laptop computers, notebook computers, Tablet PCs, consumer and/or industrial devices and/or appliances and/or processes, hand-held devices, personal digital assistants, multimedia Internet enabled mobile phones, multimedia players, and the like.

As will be appreciated independent software vendor component 108 can include a plurality of disparate software vendors each software vendor creating developing, and/or maintaining applications directed towards disparate segments of the mobile device market. For example, a first software vendor can produce applications for mobile devices that are based on a first operating system whereas a second software vendor can be in the business of developing applications for use on a second mobile device platform. Moreover, a third software vendor can develop applications that are directed towards applications that can be executed on all, or almost all, mobile devices regardless of platform or operating system, or the software vendor can create applications directed towards applications that are specific to particular business functionalities or utilities (e.g., accounting software, time management software, . . . ).

Figure 2:
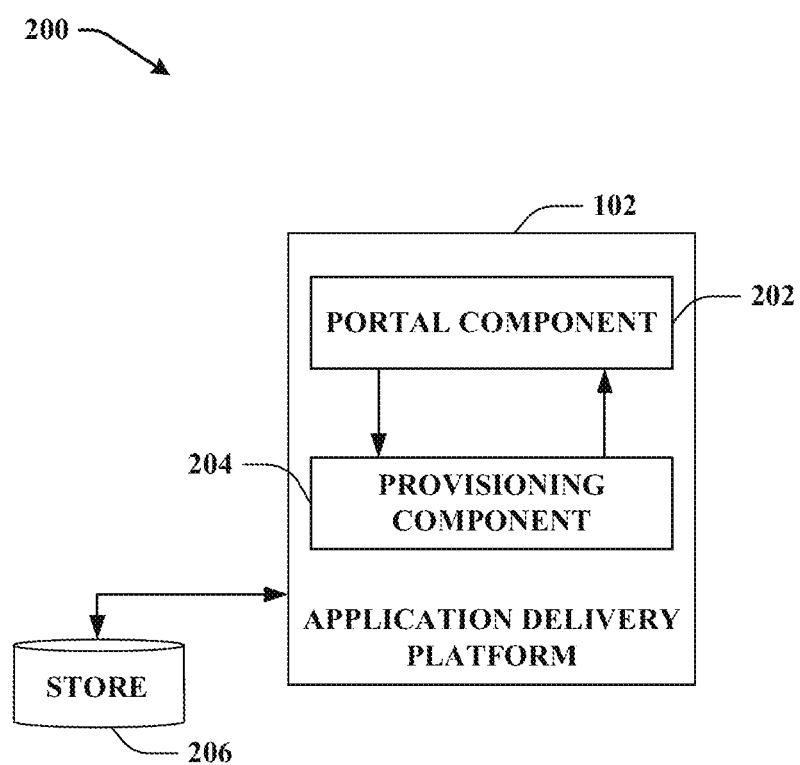
FIG. 2 provides a more detailed depiction of an illustrative application delivery platform that facilitates and/or effectuates purchase, configuration, dissemination, or provisioning of applications to mobile devices in accordance with the claimed subject matter.

FIG. 2 provides a more detailed illustration of application delivery platform 102 in accordance with various aspects of the claimed subject matter. As depicted application delivery platform 102 can include portal component 202 that can provide an initial interface between small to medium sized business component 106 and application delivery platform 102. Portal component 202 can provide users (e.g. system administrators) associated with small to medium sized business organizations the ability to identify, locate, purchase, provision, and manage applications that have been deployed or will be deployed to the various mobile devices 110. Additionally, portal component 202 can provide users the ability to selectively provision and manage applications that have been deployed or will be deployed to the various mobile devices 110 based on, for example, the job functionality of the user associated with the individual mobile device or on the applications that have been, or will be deployed, on each mobile device 110. Moreover, portal component 202 can be utilized to acquire or retrieve customer specific information (e.g., billing information, customer identification information, data regarding the various and disparate mobile devices that a customer needs to provision, the assorted applications that need to be provisioned to the various mobile devices owned/leased by the small to medium business establishment, the applications and/or versions of applications that are currently present on extant mobile devices owned/leased by the small to medium business establishment, the user profiles associated with each of mobile devices owned/leased by the small to medium business organization, . . . ) as well as telecommunication vendor (or carrier) specific information. Where a customer has never utilized application delivery platform 102, further information necessary to establish an account and/or a presence with application delivery platform 202 can also be obtained by portal component 202. It is to be appreciated by those ordinarily skill in the art, without limitation or loss of generality, that the information (or portions thereof) acquired or retrieved by portal component 202 can also be a obtained from one or more databases that can be associated with a particular telecommunications vendor/carrier or from mobile device manufacturers, for example.

Additionally, portal component 202 can also be employed to create and recommend bundles of applications that can be utilized for the various job functionalities performed within a small or medium sized business entity. For instance, application bundles can be created and recommended by portal component 202 for use by a wide variety of personnel that can make up a small to medium sized business organization. For example, one application bundle created and/or suggested by portal component 202 can be directed towards management and/or accounting tools that can be utilized by administrative personnel, whereas another bundle of applications can be directed towards marketing or sales personnel, and a further bundle of applications can be directed to system administrative or computer support employees.

Furthermore, portal component 202 can be employed to provide a single point of sale for the purchase and/or acquisition of the various and/or disparate applications provisioned to the plurality of mobile devices 110. For example, a system administrator associated with a small to medium sized business entity or organization (e.g., small to medium sized business component 106) can utilize portal component 202 to enter information related to multiple distinct mobile devices (e.g., mobile device 110), each of which can be associated with (or is to be associated with) disparate job functionalities within the small to medium sized business entity. Portal component 202, based at least in part on the received or solicited information regarding the disparate devices (e.g., mobile devices 110), various job functionalities, and assorted applications (e.g., deduced and/or bundled by portal component 202 utilizing one or more artificial intelligence or machine learning facilities) to be delivered to each of these disparate devices, can establish how the small to medium business entity or organization should be billed for provisioning each of the identified mobile devices with the appropriate applications that fulfill the requirements set forth by the system administrator associated with small to medium sized business or as determined by portal component 202. For instance, portal component 202, in conjunction with independent software vendor component 108, can determine or establish the payment terms or tariffs for each application delivered to each of the mobile devices 110.

Additionally application delivery platform 102 can include provisioning component 204 that based at least in part on input received from portal component 202 can automatically configure and/or provision the various disparate mobile devices with appropriate applications. In accordance with an aspect of the claimed subject matter, provisioning component 204 can provide indication to independent software vendor component 108 that a particular application is needed to provision a particular mobile device 110. Upon dispatch of such indication provisioning component 204 can wait for the application to be delivered to it by independent software vendor component 108 at which point provisioning component 204 can configure the application and thereafter disseminate it to the mobile device. Alternatively and/or additionally, provisioning component 204 can forward to independent software vendor component 108 the necessary configuration details needed to configure the application for a particular mobile device, at which point independent software vendor component 108 can return the applications that are configured for the mobile device which provisioning component 204 can subsequently disseminate to the appropriate mobile device(s). This latter facility can, for example, be utilized where provisioning component 204 is unaware of current applications from an independent software vendor that meet the requirements deduced by portal component 202 or requested by administrators associated with small to medium sizes business component 106. For example, a mobile device new to the market may not have a version of a business software that runs on it, so provisioning component 204 can send a request to an independent software vendor associated with independent software vendor component 108 indicating that there is a need and/or requirement for a version of business software capable of running on the new mobile device. In this manner the software vendor can be apprised of an impending need or requirement for its applications and thus develop business software for new to the market mobile devices. As a further addition and/or alternative, independent software vendor component 108 can, if necessary, dispatch configured applications directly to the mobile device thereby circumventing provisioning component 204 altogether.

Additionally, application delivery platform 102 can include store 206 that can include any suitable data necessary for application delivery platform 102 to facilitate it aims, such as customer information (e.g., unique identifiers for existing mobile devices), billing account information linked to each and every device associated with the customer, etc. For instance, store 206 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posited, response time for questions, blog data, blog entries, endorsements, items bought, items sold, products on the network, information gleaned from a disparate website, information obtained from a disparate network, ratings from a website, a credit score, a donation to charity, or any other information related to software, applications, web conferencing, and/or any suitable data related to transactions, etc.

It is to be appreciated that store 206 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 206 of the subject systems and methods is intended to comprise, without being limited to, these and any other suitable types of memory. In addition, it is to be appreciated that store 206 can be a server, a database, a hard drive, and the like.

Figure 3:
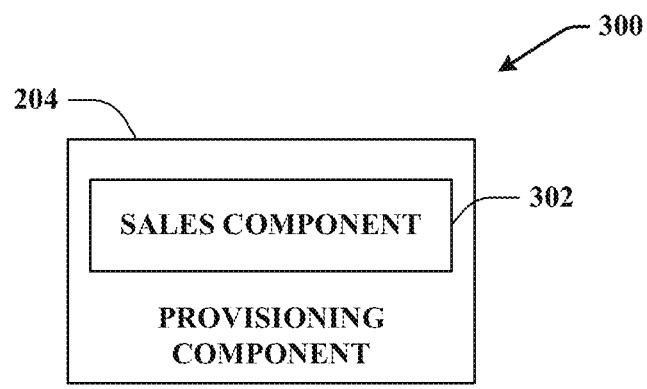
FIG. 3 provides a more detailed depiction of an illustrative provisioning component that facilitates and/or effectuates purchase, configuration, dissemination, or provisioning of applications to mobile devices in accordance with the claimed subject matter.

FIG. 3 provides further illustration of provisioning component 204 in accordance with further aspects of the claimed subject matter. As illustrated, provisioning component 204 can include sales component 302 that can facilitate and/or effectuate purchase, dissemination, configuration, and/or provisioning of different and/or disparate applications reposited locally to provision component 204 or persisted remotely from provisioning component 204 (e.g., stored or obtained from independent software vendor component 108) to one of more diverse mobile device included in the plurality of mobile device 110. In accordance with one or more aspects of the claimed subject matter, sales component 302 can receive or elicit details regarding a small to medium sized business organization and/or entity. Information that can be obtained or requested from such a small to medium sized business organization and/or entity can include what types of mobile devices 110 that are being employed by the small to medium sized organization and/or entity, the various types of functionalities to which the various mobile devices 110 are being employed or are to be utilized, the current status the small to medium sized business entity and/or organization has with application delivery platform 102 (e.g., whether small to medium sized business entity and/or organization is a current customer of application delivery platform 102, billing information, payment details, configuration information of all the mobile devices that a particular small to medium sized business entity and/or organization might have ordered or current owns or leases, . . . ). Based at least in part on such received and/or elicited information, sales component 302 can retrieve various recommended application bundles that can be suitable for the various tasks and/or functionalities and the capabilities of the mobile devices associated with the small to medium sized business entity. Furthermore, sales component 302 can provide suggestions or recommendations as to other applications that might not have been previously considered or contemplated but that nevertheless can be used by small to medium sized business to fulfill or enhance one or more job functionalities or tasks undertaken by personnel in possession of the mobile devices. Moreover, sales component 302 can make note of functionalities that may be performed by small to medium size business or organization for which there currently are no applications, or where a particular mobile device is incapable of executing applications that address the noted functionality (e.g., the independent software vendor has applications that address the noted functionality, but the applications do not execute on the particular mobile device platforms possessed by the small to medium sized business organization).

Once sales component 302 has obtain all necessary information, it can cause other aspects of provisioning component 204 to effectuate dissemination, configuration, and provisioning of the various mobile devices owned, ordered, or leased by small to medium sized business organization with appropriate applications. For example, provisioning component 204, at the instigation of sales component 302, can initially deploy an agent to the mobile devices associated with the small to medium size business at issue, the agent can perform an analysis of the mobile device to which it is deployed and further perform any necessary setup, initialization, and/or cleanup in preparation to receiving the one or more application subsequently disseminated from provisioning component 204. It should be noted that specific configuration of allocated and/or disseminated applications can be performed locally on the mobile device by the agent or can be performed by provisioning component 204 prior to the application being dispatched from provisioning component 204. Additionally and/or alternatively, the agent can also provide configuration facilities and/or functionalities when, and if, applications are sent directly from independent software vendor component 108. This latter facility and/or functionality can be employed, for example, when independent software vendor component 108 disseminates application updates, security patches, etc. or when an extant application, available on other mobile devices but currently not available on a particular mobile device, is sent from independent software vendor component 108 to the affected mobile device thereby circumventing the facilities of provisioning component 108.

Figure 4:
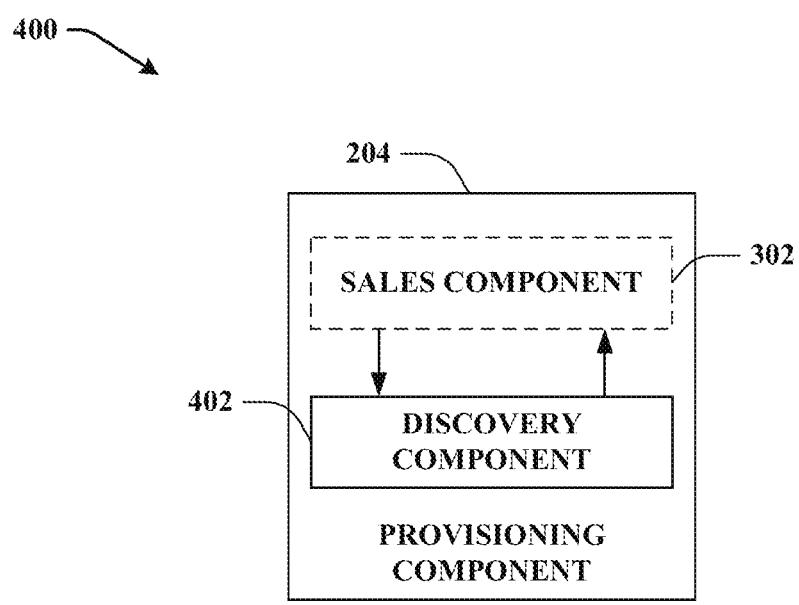
FIG. 4 provides further illustration of an illustrative provisioning component that facilitates and/or effectuates purchase, configuration, dissemination, or provisioning of applications to mobile devices in accordance with the claimed subject matter.

FIG. 4 provides yet further illustration of provisioning component 204 in accordance with an aspect of the claimer subject matter. As illustrated, in addition to sales component 302 the functionalities and facilities of which have been elucidated above in connection with FIG. 3, provisioning component 204 can also include discovery component 402 that can permit small to medium sized businesses and/or individuals to discover applications that they want to purchase and provision to their various and diverse mobile devices. Discovery component 402 can allow small to medium sized businesses (or more particularly, system administrators associated with such small to medium sized business organizations) to connect with so that they can identify and/or purchase applications to be executed on one or more mobile devices associated with the small to medium sized business entities. Discovery component 402 can, like sales component 302, receive and/or solicit information from small to medium sized business organization, such as, whether the small to medium sized business entity is a current customer (if not discovery component 402, like sales component 302, can establish a customer presence for the small to medium sized business organization), billing information, payment details, configuration information of the proposed mobile devices to which the application is to be applied, the proposed usage of such applications, etc. Based at least in part on information gathered and/or deduced or inferred (e.g., through utilization of artificial intelligence or machine learning techniques) discovery component 402 can cause identified and/or purchased applications to be delivered to the various selected mobile devices associated with small to medium sized business organization.

Figure 5:
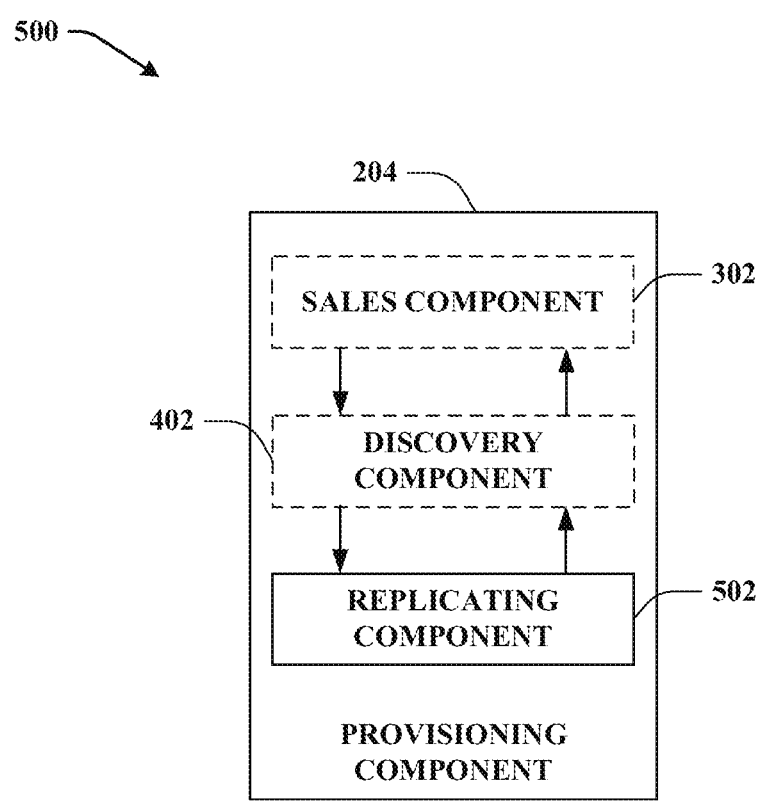
FIG. 5 provides yet further depiction of an illustrative provisioning component that facilitates and/or effectuates purchase, configuration, dissemination, or provisioning of applications to mobile devices in accordance with the claimed subject matter.

FIG. 5 illustrates a further aspect of provisioning component 204 in accordance with further aspects of the claimed subject matter. As depicted provisioning component 204 can further include replicating component 502 that can allow small to medium sized business entities or individuals associated with small to medium sized business organizations to add applications or users to an existing customer profile established for the small to medium sized business entity. As will be appreciated by those of reasonable skill in the art, this aspect of the claimed subject matter, will typically require that the small to medium sized business entity to have previously established a customer profile with application delivery platform 102.

In addition, replicating component 502 can also be utilized in instances when personnel at small to medium sized business entity request applications that are not available for provisioning by provisioning component 204 (e.g., applications that have yet to be written for a particular business functionality, applications that are currently no available for a particular mobile device platform, and the like). Here for example, replicating component 502, once the details of the desired application has been noted, can communicate with independent software vendor component 108 to inform it that an application that current does not exist is required. When independent software vendor component 108 receives this indication from replicating component 502 it can commence developing the necessary application which upon completion can be dispatched to application delivery component 102 where the newly developed application can be distributed, configured, and/or provisioned to the requesting small to medium sized business organization as well as persisted for future distribution and configuration to other requesting small to medium sized business entities that might require the recently developed application.

Figure 6:
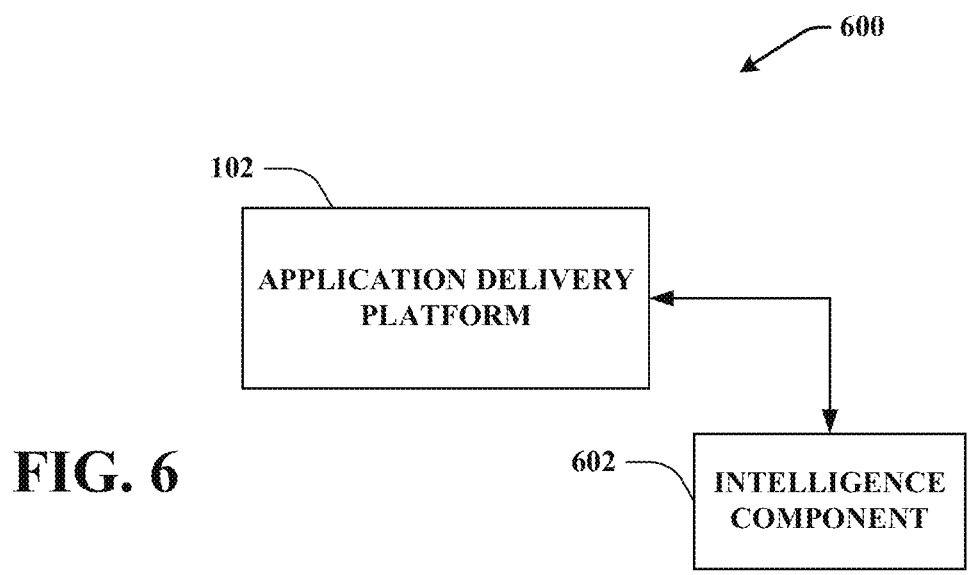
FIG. 6 provides a further depiction of a machine implemented system that facilitates and/or effectuates purchase, configuration, dissemination, or provisioning of applications to mobile devices in accordance with the claimed subject matter.

FIG. 6 depicts a system 600 that employs artificial intelligence to facilitate and/or effectuate application delivery to a variety of disparate mobile devices in accordance with an aspect of the claimed subject matter. Accordingly, as illustrated, system 600 can include an intelligence component 602 that can employ a probabilistic based or statistical based approach, for example, in connection with making determinations or inferences. Inferences can be based in part upon explicit training of classifiers (not shown) or implicit training based at least in part upon system feedback and/or users previous actions, commands, instructions, and the like during use of the system. Intelligence component 602 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Intelligence component 602 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 7:
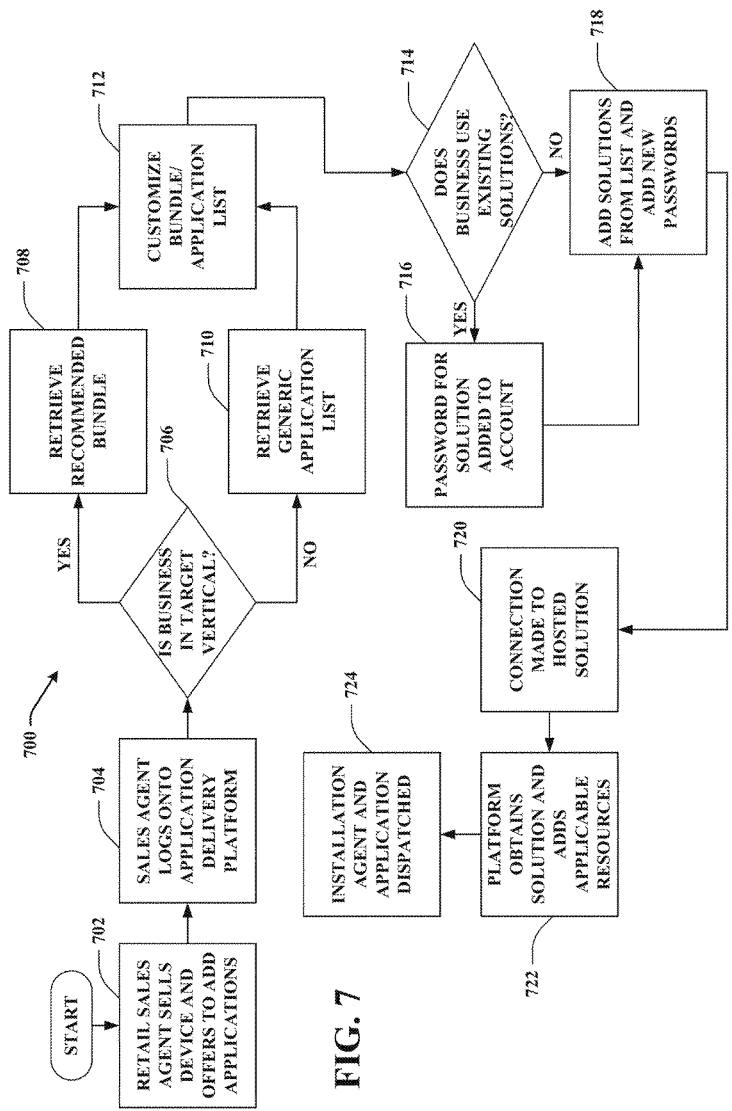
FIG. 7 illustrates a flow diagram of a machine implemented methodology that effectuates and/or facilitates purchase, configuration, dissemination, or provisioning of applications to mobile devices in accordance with the claimed subject matter.
Figure 8:
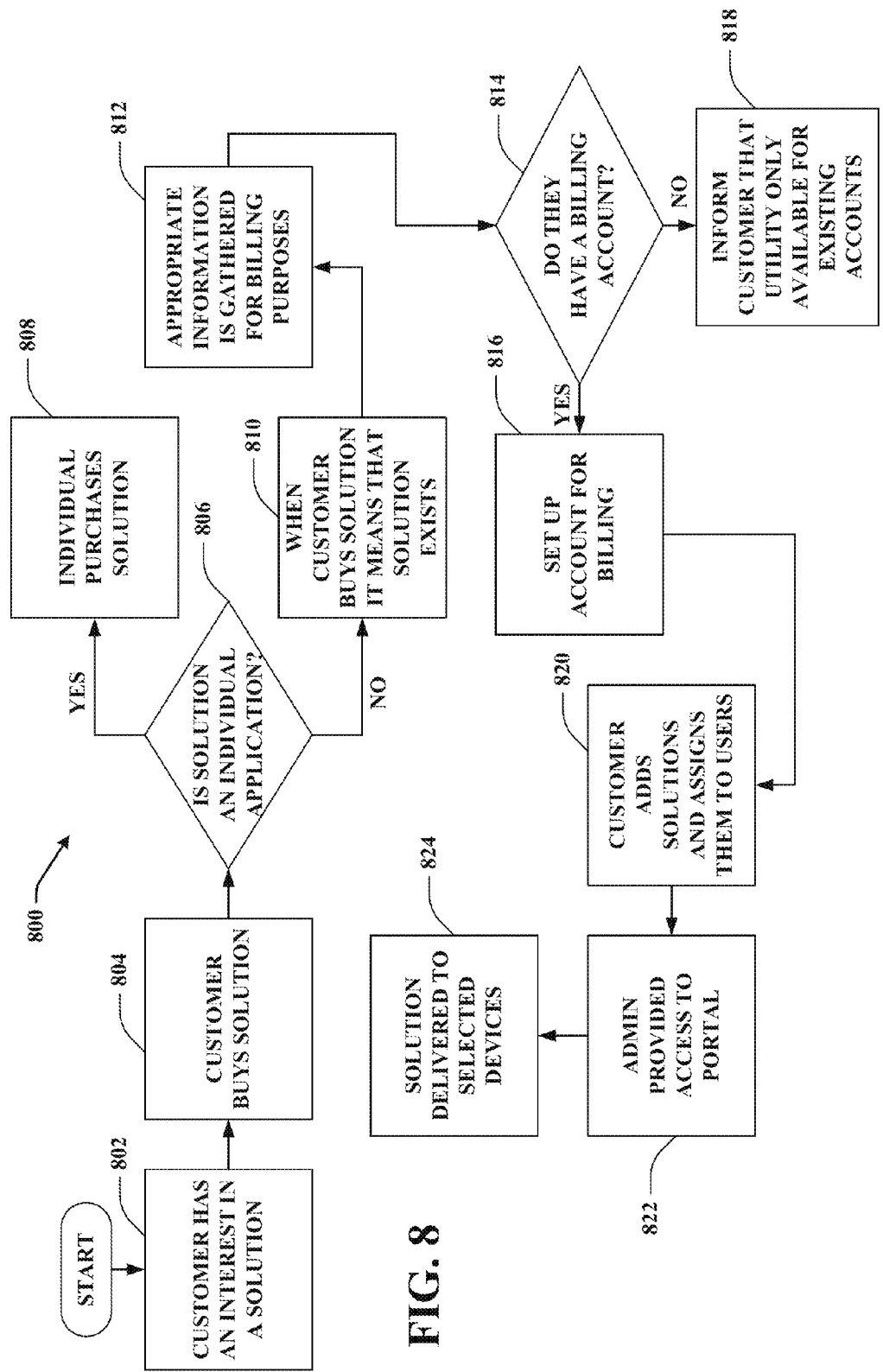
FIG. 8 illustrates a flow diagram of a machine implemented method that effectuates and/or facilitates purchase, configuration, dissemination, or provisioning of applications to mobile devices in accordance with the claimed subject matter.
Figure 9:
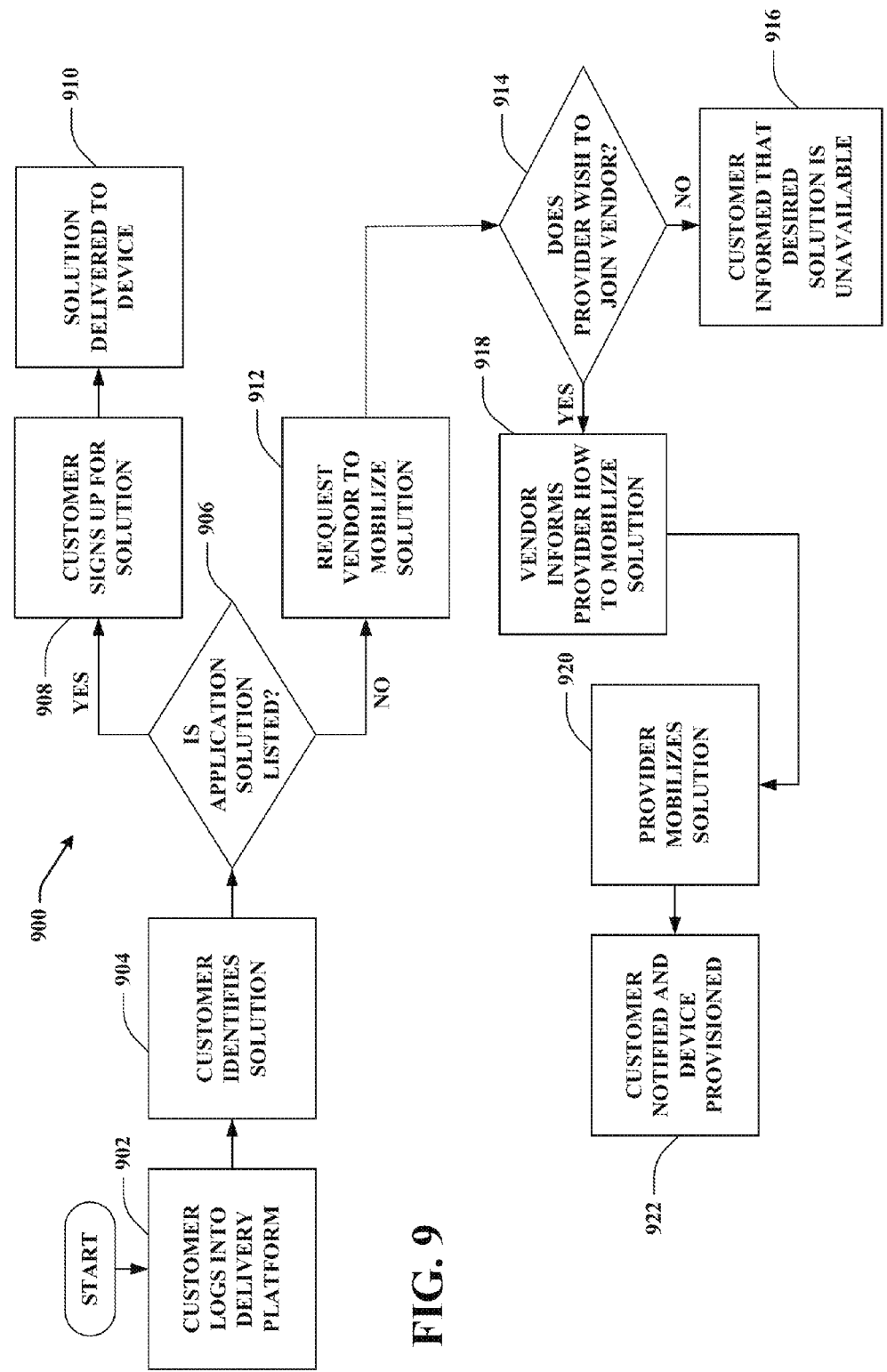
FIG. 9 illustrates a flow diagram of a machine implemented methodology that effectuates and/or facilitates purchase, configuration, dissemination, or provisioning of applications to mobile devices in accordance with the claimed subject matter.

In view of the illustrative systems shown and described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 illustrates a methodology 700 that facilitates the disseminating, configuring, and/or provisioning applications to one or more mobile device in accordance with an aspect of the claimed subject matter. As illustrated methodology 700 can commence at 702 where a retail sales agent can sell a device (or a set or series of disparate devices) to a small to medium sized business entity or organization. At 704 the sales agent can log onto an application delivery platform. At 706 a decision can be made as to whether or not the small to medium sized business entity falls within a target vertical (e.g., whether or not there exists a predefined set of applications that substantially or totally satisfies the needs of a particular small or mediums sized business).

Where, at 706 the response to the query is positive (e.g., YES) methodology 700 can proceed to 708 whereupon a recommended bundle of applications can be retrieved (e.g., from local and/or remote storage devices and/or databases, or from repositories associated with one or more independent software vendors) or can be deduced through use of one or more artificial intelligence or machine learning techniques after which methodology 700 can proceed to 712. Where at 706 the response to the query is negative (e.g., NO) methodology 700 can proceed to 710 where a generic list of applications can be presented after which the method can progress to 712. It should be noted without limitation or loss of generality, that in providing the generic list of applications, machine learning and artificial intelligence methodologies can be utilized to infer a more constrained list of applications more suited to the small to medium sized business organization at issue. For instance, where a small to medium sized business organization is in the field of marketing, artificial intelligence and/or machine learning techniques can be employed to whittle down the generic list of applications to those that would better suit business organizations in the field of marketing.

At 712 depending upon whether a recommended bundle was retrieved or a generic application list is presented, the recommended bundle or the generic application list can be customized to suit the particular small to medium sized business at issue. Customization of either the recommended bundle or the generic application list can include augmenting applications to the list or bundle, or removing applications from the bundle or list as circumstances dictate. Once the application bundle or list has been suitably customized to the small to medium sized business' satisfaction, methodology 700 can proceed to 714 where another decision block can be encountered.

At 714 the query can be posited as to whether or not the small to medium sized business organization currently use a previously suggested or existing solution. If the response to the query at 714 is affirmative (e.g., YES) methodology 700 can progress to 716 where a password for the solution can be added, for example to an existing or established customer profile, thereby associating the solution to the application platform 102 after which method 700 can proceed to 718. If on the other hand the response to the query at 714 is negative (e.g., NO) methodology 700 can proceed directly to 718 at which point solutions selected from the generic application list can be added to the customer profile and, if necessary, new passwords can be established and associated with the customer profile.

At 720 connection can be made to a hosted solution (e.g., a solution obtained from an independent software vendor 108, or from a data repository associated with application delivery platform 102) and an acknowledgement can be received in return. At 722 the application delivery platform 102 can collect the provisioning information necessary (e.g., mobile device configuration data, password information, etc.) and further, if applicable adds application delivery platform specific information to the collected provisioning information. At 724 once all the provisioning information has been collect and the solution ready for deployment, the provisioning information together with the solution (application package) can be sent to a previously deployed agent situated on mobile devices 110, the previously deployed agent then can go about correctly installing and configuring the application package on the mobile device to which the solution has been deployed, FIG. 8 depicts a machine implemented method 800 for disseminating, configuring, and/or provisioning applications to mobile devices in accordance with an aspect of the claimed subject matter. As depicted method 800 can commence at 802 where a customer visits the application delivery platform 102 (e.g., through utilization of the Internet and its associated protocols and technologies). At 804 the customer can select and purchase a solution. At 806 a query can be addressed as to whether or not the selected and purchased solution is an individual application. If the response to the query is affirmative (e.g., YES) then method 800 can proceed to 808 where the selected or identified application can be purchased at which point the method can terminate. If on the other hand the response to the query posited at 806 is negative (e.g., NO) then method 800 can proceed to 810 wherein because the user/customer was allowed to select and purchase the solution this implies that the solution (e.g., application) currently exists, and based on this implication methodology 800 can proceed to 812. At 812 appropriate information can be gathered for billing and configuration purposes, after which method 800 can proceed to decision block 814. At 814 a query can be addressed as to whether or not the customer (e.g., small to medium sized business organization or entity 106) has a billing account. If the response to the query at 814 is affirmative (e.g., YES) method 800 can proceed to 816 where the billing account can be setup or further amended/updated. If the response to query at 814 is negative (e.g., NO) method 800 can proceed to 818. At 818 the customer can be informed that the utility effectuated by method 800 is only available for existing customer accounts, at which point method 800 can terminate.

Returning to act 816, once the billing account and login information setup has been performed at 816, method 800 can proceed to 820 where a customer can select and add one or more application solutions to the billing account as well as assign the one or more selected application solutions to those users within the small to medium sized business that require such solutions. At 822 network administrators or system administrators affiliated with the small to medium-sized business associated with the billing account can be provided access to application delivery platform 102. At 824 the one more selected application solutions can be dispatched, configured, and provisioned to identified mobile devices 110 associated with the small to medium-sized business organization.

FIG. 9 illustrates a machine implemented methodology 900 for distributing, configuring, and/or provisioning applications to mobile devices in accordance with an aspect of the claimed subject matter. As depicted methodology 900 can commence at 902 where a customer can login into an application delivery platform (e.g., application delivery platform 102). At 904 a customer can identify and locate one or more new applications appropriate for the small to medium-sized business' needs (e.g., from a presented list), after which method 900 can proceed to decision block 906. At 906 a query can be posited regarding whether or not the identified and selected one or more new applications are currently extant, known to, and/or persisted on the application delivery platform. If the response to the query posed at 906 is affirmative (e.g., YES), then methodology 900 can proceed to 908. At 908 the customer (e.g., small to medium-sized business) can sign up for delivery of the new application or can add or associate a new user to the application if the application has previously been selected by the customer. At 910 the identified or selected solution can be delivered or dispatched to the mobile device that requires the application and/or is associated with the new user, at which point method 900 can terminate. If on the other hand, the response to the query posited at 906 is negative (e.g. NO) then methodology 900 can proceed to 912 whereupon a request can be made to a software vendor/provider (e.g., one of the many software providers or vendors included in independent software vendor component 108) for the software vendor/provider to mobilize a solution, after which method 900 can proceed to another decision block 914. A decision block 914 application delivery platform (e.g., application delivery platform 102) can query the software vendor/provider (e.g., the software/application vendor/provider that is to supply the solution) as to whether or not it wishes to collaborate with application delivery platform (e.g. application delivery platform 102). If the response to this query is negative (e.g. NO) method 900 proceeds 916 where the customer can be informed that their desired application cannot be delivered to them and/or is not available after which method 900 can halt. If on the other hand, the response to the query posited 914 is positive (e.g., YES) method 900 can proceed to 918 whereupon the application delivery platform (e.g., the vendor since the purchase and sale of the application solution is being facilitated through application delivery platform 102) can inform the software provider (e.g., the software/application vendor/provider that is to supply the solution included in independent software vendor component 108) of the protocols and/or procedures on how to mobilize the solution (e.g., how the identified and selected application should be supplied and to whom it should be supplied). At 920 the software provider can mobilize the solution according to the protocols and procedures specified or outlined at 918, after which method 900 can proceed to 922. At 922 the requesting customer can be notified of the delivery of the identified and selected application solution and the mobile device upon which the selected application solution is to execute appropriately provisioned and the application configured to run on the mobile device.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
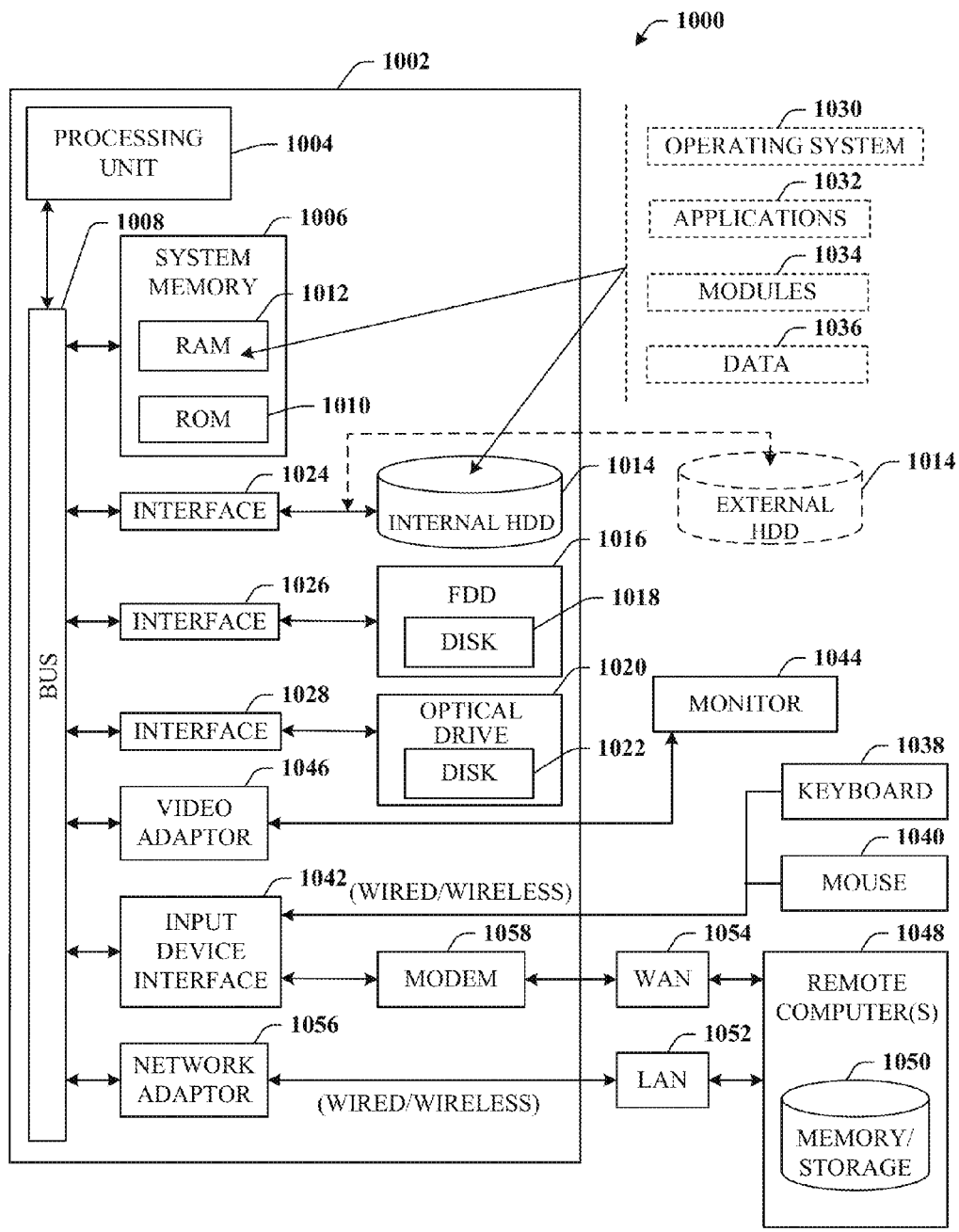
FIG. 10 illustrates a block diagram of a computer operable to execute the disclosed system in accordance with an aspect of the claimed subject matter.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the illustrative environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are illustrative and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
   a processor; and
   a memory that stores executable instructions that, when executed by the processor, facilitate performance of operations, comprising:
   in response to receiving, from a network device, a request for a first application, determining, based on a user identity and data representing historical data, extrinsic data, context data, and state data associated with the user identity, that a benefit associated with making a correct decision in regard to selecting the first application associated with a first distinguishable application functionality rather than selecting a previously sent second application associated with a second distinguishable application functionality outweighs a cost associated with not making the correct decision in regard to not selecting the first application rather than selecting the previously sent second application; and in response to the determining, sending the first application to a user device or the second application to the user device.

2. The system of claim 1, wherein the request from the network device comprises account information regarding a business identity, and wherein the account information comprises employee and financial information associated with the business identity.

3. The system of claim 1, wherein the request from the network device comprises information regarding a configuration of the user device.

4. The system of claim 2, wherein the user device is assigned to a user role within the business identity.

5. The system of claim 1, wherein the operations further comprise utilizing over the air data interchange with the user device to send the first application.

6. The system of claim 1, wherein the network device is associated with a business identity of independently operating business identities.

7. The system of claim 1, wherein the operations further comprise updating the first application in response to identifying that an update to the first application has been received from a vendor device.

8. The system of claim 1, wherein the operations further comprise:
enabling additional user devices, other than the user device and affiliated with the network device associated with a business identity, to utilize the previously sent second application deployed on the additional user devices; and
providing configuration information to the additional user devices to configure the additional user devices to utilize the previously sent second application.

9. The system of claim 1, wherein the user device is a first user device, and wherein the operations further comprise facilitating a device affiliated with a service provider device to manage the first application requested by the network device.

10. The system of claim 1, wherein the operations further comprise facilitating a device to identify a third application functionality currently not extant with respect to the user identity.

11. The system of claim 10, wherein the operations further comprise sending the third application functionality to a vendor device that employs the third application functionality to enhance the first application resulting in an application update.

12. The system of claim 11, wherein the application update is received from the vendor device by the user device, and wherein the operations further comprise receiving a notification that the application update has been received from the vendor device.

13. The system of claim 11, wherein the operations further comprise:
receiving the application update that is received from the vendor device; and
sending the application update to the user device.

14. A method, comprising:
determining, by a system comprising a processor, a difference between facilitating execution on a device of a first distinct application functionality associated with a first application and facilitating execution on the device of a second distinct application functionality associated with a second application, wherein the difference is determined as a function of data representing historical data, extrinsic data, context data, and state data associated with an identity associated with the device and a utility based inference that determines that a benefit associated with making a decision correctly in relation to the first distinct application functionality and the second distinct application functionality outweighs a cost associated with making the decision incorrectly in relation to the first distinct application functionality and the second distinct application functionality;
configuring, by the system, the first application for execution on the device; and
sending, by the system, the first application to the device.

15. The method of claim 14, further comprising:
determining, by the system, that a vendor device is not affiliated with a service provider device; and
requesting, by the system, that the vendor device join with the service provider device prior to the sending of the first application to the device.

16. The method of claim 14, further comprising utilizing, by the system, over the air data communication with the device during the sending of the first application.

17. The method of claim 14, further comprising identifying, by the system, an application functionality not currently facilitated by the first distinct application functionality and the second distinct application functionality, wherein the application functionality is associated with data representative of a user role.

18. The method of claim 14, further comprising, in response to a vendor device sending an update for the device, augmenting, by the system, the first application with a distinguishable application functionality not facilitated by the first distinct application functionality and the second distinct application functionality, wherein the update comprises the distinguishable application functionality.

19. A non-transitory machine-readable storage medium, comprising executable instructions that, when executed by a processor, facilitate performance of operations, comprising:
in response to receiving a request, facilitated by an agent executing on a remote device, for an application and as function of an operation associated with a first application functionality previously initiated on the remote device, performing a cost versus benefit analysis to identify the application, wherein facilitating on the remote device of the first application functionality differs from facilitating on the remote device of a second application functionality associated with the application, and wherein the cost versus benefit analysis uses data, representative of historical data, extrinsic data, context data, and state data associated with an identity, to determine a benefit associated with a decision relating to the first application functionality and the second application functionality being greater than a cost associated with not making the decision relating to the first application functionality and the second application functionality; and
as a function of the cost versus benefit analysis, sending the application with the first application functionality, or sending the application with the second application functionality, to the remote device.

20. The non-transitory machine-readable storage medium of claim 19, wherein the operations further comprise identifying a functionality currently not extant with respect to a job functionality of the identity associated with the remote device.

* * * * *